United States Patent Office 3,465,059
Patented Sept. 2, 1969

3,465,059
CARBOXY TERMINATED GRAFT COPOLY-
MERS OF CARBONAMIDE GROUP ON
ACRYLIC COPOLYMERS
Manfred K. Seven, Long Valley, and Richard J. Bellet, Mountain Lakes, N.J., assignors to Allied Chemical Corporation, New York, N.Y., a corporation of New York
No Drawing. Filed Nov. 28, 1966, Ser. No. 597,212
Int. Cl. C08g 41/04; C08f 27/08
U.S. Cl. 260—857                    10 Claims

ABSTRACT OF THE DISCLOSURE

This invention relates to polyamide graft polymer compositions containing polyamide homopolymer and polyamide graft polymer in which polyamide chains are grafted onto active sites provided by a copolymer of a major portion of an ethylenically unsaturated monomer and minor portion of an unsaturated compound providing carboxy groups, such as the acrylic acid esters, and to a process for their preparation by first admixing the ethylenic copolymer with shearing agitation with a polyamide-forming monomer at a temperature above the softening point of the ethylenic copolymer to form a dispersion of fine molten particles of the ethylenic copolymer in the polyamide-forming monomer, and thereafter effecting polymerization of the polyamide-forming monomer at a temperature above the melting point of the polyamide, in the presence of a chain terminating agent for the polyamide, to form a molten polymer composition having a stable melt index, and recovering the polyamide graft polymer composition.

---

This invention relates to new and improved process for producing polyamide graft polymer compositions and to the graft polymer compositions produced thereby and containing polyamide homopolymer and polyamide graft polymer in which polyamide chains are grafted onto active sites provided by a copolymer of a major portion of an ethylenically unsaturated monomer and minor portion of an unsaturated compound providing carboxy groups such as the acrylic acid esters.

Polyamides such as those commonly known as nylon are widely used and exhibit a number of desired properties including hardness, tensile strength, toughness and rigidity.

A well-known drawback of the polyamides is a deficiency in impact strength for certain applications, especially impact strength at low temperatures. In the past, it has been proposed to combine the polyamide resins in physical admixture with other hydrocarbon polymers acting essentially as plasticizers to obtain less rigid and more flexible products having correspondingly improved impact strength. However, while the addition of such other hydrocarbon polymers improved certain properties at room temperature the addition thereof resulted in a depreciation of properties at low temperatures. It has also been heretofore proposed to graft polyamides onto a hydrocarbon backbone where the monomeric units of the backbone have acid functional groups pendant therefrom, so that a polyamide branch was grafted onto the monomeric units of the backbone through such functional groups. However, when heating such graft polymer products it was found that melt viscosity tended to increase making processing very difficult or impossible. Such increase in melt viscosity was caused apparently by the high degree of branching of polyamide side chains which resulted in hydrogen bonding between the closely adjacent polyamide branches.

In the co-pending application of R. J. Bellet and R. J. Kray, Ser. No. 436,685 now Patent No. 3,388,186, there is described a process and graft polymer product in which a polyamide is grafted onto certain copolymers derived essentially from a major portion of a monomer having ethylenic unsaturation such as ethylene and a co-monomeric material presenting pendant organic radicals including a carboxy radical in the copolymer product, an illustrative example of such a copolymer being an ethylene-ethyl acrylate copolymer containing 1 to 20% of ethyl acrylate. The graft copolymers provided by such application were found to have good melt stability and other overall properties including high impact strength both at ambient and reduced temperatures, thus satisfactorily overcoming deficiencies of the polyamides, and other derivatives and mixtures thereof proposed in the past as improvements thereon. However, when attempting to produce such graft copolymers on a large or commercial scale it was found that difficulties arose in producing satisfactory products and in maintaining desired properties which overcame past deficiencies. For example, apparently satisfactory products became difficult to mold into acceptable products and often exhibited a deficiency in important properties such as impact strength. The products also formed films of unsatisfactory clarity making the same unsuitable for film-forming. These effects were difficult to explain by virtue of their nature and especially in view of success in producing satisfactory products on a smaller scale. However, it was observed on scale up of the reaction that reaction rates were faster than in the case of ordinary homopolymerization of caprolactam indicating a possible catalytic effect on the polymerization by the presence of the copolymer. It was also found on scale up that the reaction could not be terminated in a conventional manner by allowing water vapor to accumulate above the reaction mass, but rather unexplainably continued or apparently continued to form a product of increasingly higher melt viscosity. Thus product recovery was also difficult in such cases and the products so produced exhibited a poor impact strength despite a prior relationship between high impact strength and the higher melt viscosities. Analysis of these unsatisfactory products also showed non-homogeneous areas of high crystallinity apparently not present in the products similarly produced but on a smaller scale.

The principal object of the present invention is to provide a new and improved process for producing polyamide graft polymers, especially on an efficient large scale basis. Another object of the invention is to provide a process for producing polyamide graft copolymers of superior overall properties including melt stability and high impact strength at both ambient and reduced temperatures. Other objects and advantages will be evident from the following description of the invention.

In accordance with the present invention polyamides are grafted onto ethylenic copolymers containing functional carboxy radicals by a new and improved process involving first admixing the ethylenic copolymer with shearing agitation with the polyamide-forming monomer at a temperature above the softening point of the ethylenic copolymer to form a dispersion of fine molten particles of said ethylenic copolymer in said polyamide-forming monomer and thereafter effecting polymerization of said polyamide-forming material at a temperature above the melting point of the polyamide in the presence of a chain terminating agent for the polyamide to form a molten polymer composition having a stable melt index above 0.1 up to about 100, desirably between 1 to 30, and recovering said polyamide graft polymer composition. The process of the invention is particularly adapted for large scale operation and efficiently and consistently produces a polyamide graft copolymer composition of exceptional good overall properties including excellent impact strength both at ambient temperatures and reduced temperatures, hardness, flexibility, extensibility, processability including melt stability in part believed to be provided from the excellent homogeneity and increase in the degree of grafting of the product resulting from the process. Benefits of the process in terms of the products also are exhibited by a substantial absence of peeling on molding of the graft polymer and ability to form clear films substantially free of curds or "pimples" thus improving the appearance of film products produced from the graft polymers.

A first requirement in carrying out the invention is the dispersion of the normally solid ethylenic copolymer in the molten polyamide-forming monomer, which materials have at best only very limited mutual solubility even at elevated temperatures. The desired dispersion is formed between the polyamide-forming monomer and fine molten or heat softened particles of the copolymer. The particularly preferred manner of forming the dispersion involves heating of the polyamide-forming monomer and ethylenic copolymer together with high shear agitation at a temperature above the softening temperature of the copolymer until the dispersion is produced as evidenced by the presence in the liquid monomer of fine molten particles of the copolymer. Once the dispersion is formed the shearing agitation is continued to maintain the dispersion and prevent coalescence of the dispersed particles. The temperature for forming the dispersion is desirably at least about 80° C. above the softening point of the copolymer and usually as high as practical to permit the most efficient formation and dispersion of the copolymer particles. Preferred temperatures for forming the dispersion generally are in the range of about 200° C. to 280° C., more preferably 230° C. to 270° C. The copolymer may be suitably charged to the dispersing operation as commercially supplied in the form of pellets or other similar form. While the charging of smaller size material may be helpful in reducing dispersion time, the obtaining of the copolymer in finer form is difficult and grinding or similar procedures to reduce particle size is preferably avoided because of the degradation effect of the grinding on the ethylenic copolymers. Time for forming the dispersion with suitable high speed shearing agitation is usually between 2½ to 5, more usually 3 to 4 hours. An anchor or helical screw type agitator is suitable. The final dispersion as produced is of the characteristic nature of a cream-like mass at temperatures within the range of the more preferred temperatures for forming the dispersion. As a result of the shearing agitation employed in forming the dispersion the molten copolymer particles are relatively fine, and believed to be typically predominantly less than approximately 0.02 inch in size, possibly such that at least a major portion are less than 0.005 inch. During formation of the dispersion the system is preferably free of oxygen or oxygen-containing gases to avoid oxidation. A nitrogen purge is suitably employed. It is also generally desirable that no substantial polymerization take place during the formation of the dispersion and for this reason it is preferable to have the charge substantially anhydrous or free of water to the extent that substantial polymerization is avoided. The nitrogen purge is usually also effective to remove moisture from the atmosphere above the mass for formation of the dispersion. The polymerization terminator may be added at any suitable time prior to substantial polymerization and is preferably added prior to forming the dispersion to assure adequate mixing in the dispersion. In the more preferred procedure the terminator is added to the monomer with some mixing prior to addition of the copolymer and such procedure is especially desirable when employing an amine terminator to precondense or complex the amine with the monomer to avoid blocking of the grafting sites on the copolymer by combination of the amine with the carboxy radical sites on the copolymer. The polymerization may be then initiated with water as for example by placing the reactor contents under pressure employing clean dry steam. A steam pressure regulated between about 20 to 80 p.s.i.g. is usually applied over a period of about 15 to 75 minutes. To avoid too rapid initiation the temperature of the reaction mass during initiation is preferably reduced to between about 180° C. to 220° C. In a preferred procedure for controlling initiation the dispersion is placed under steam pressure for about 15 to 75 minutes, preferably 20 to 45 minutes, and then slowly reduced or vented over the course of an additional period of 15 to 75 minutes, preferably 20 to 45 minutes. The system is then preferably placed under a continuous inert gas purge to remove the water of polymerization and assure absence of oxygen during the polymerization. The inert gas purge to remove water vapor and oxygen is preferably carried out at a temperature between about 180° C. to 220° C., or alternatively on increasing the temperature to the polymerization temperature. The polymerization and grafting of the polyamide may be then commenced on increasing the temperature above the melting point of the polyamide to within the range for hydrolytic polymerization, usually between about 230° C. to 290° C., preferably between 250° C. to 260° C. Agitation of the reaction mass is continued throughout the polymerization and grafting which usually covers a period between about 8 to 20 hours. The polymerization and grafting is suitably carried out at about atmospheric pressure although superatmospheric and even subatmospheric pressures may be employed. Flow of inert gas over the reaction mass is made effective to remove moisture which may undesirably lower or "poison" the caprolactam polymerization. Minor amounts of moisture influence polymerization and the rate of flow of inert gas may be regulated to control moisture content in the atmosphere above the reaction mass and hence the polymerization rate when employing the preferred dibasic acids as terminating agents in the polymerization. In the more preferred forms of practice the rate of flow of inert gas is at least about 2 unit volumes of gas, measured at standard temperature and pressure, per hour per each unit volume of the reaction mixture, preferably between about 2 to 5 unit volumes. The reaction may be terminated at the desired predetermined viscosity or melt index of the product. The process is especially effective in permitting control of melt index of the product above a melt index of 0.1, and particularly within an especially preferred range between a melt index of 1 to 30. The preferred products produced by the invention have a melt index not exceeding about 100, as measured at 240° C. with 1000 gram load. Reduced viscosities are generally in the range of about 0.1 to 15 in a 20% solution of m-cresol as measured in an Ubbelodhe Viscometer at 23° C., preferably 0.4 to 2.5. While melt index or viscosity of the mixture is conventionally a measure of molecular weight of the product it will be noted that the polymerization of caprolactam in the presence of a dibasic acid as terminator under controlled moisture conditions results in melt indices or viscosities which are different for a given molecular weight of the product than the melt indices or viscosities obtained when employing other terminators such as the monobasic acid. This effect is described in the copending application of Ian C. Twilley, Ser. No. 426,632, now Patent No. 3,386,967, filed Jan. 19, 1965. As the presence of the graft polymer in the molten polycaprolactam product also influences melt viscosity it will be evident that the melt indexes and viscosities specified herein are given with respect to practical control of the product mixture and product, disregarding the particular terminator employed, and hence not necessarily as a measure of molecular weight of the product although the melt indexes given reflect molecular weight generally within useful product ranges. The desired melt index may be attained and the reaction readily terminated by ending the inert gas purge and permitting water vapor to accumulate above the system thereby "poisoning" the reaction. Once the reaction has been terminated the melt index or viscosity of the polymer melt is very stable within a desired range which is a further desirable feature of the process. Pressurizing of the reactor with an inert gas readily permits extrusion of the graft polymer product therefrom at a stable melt viscosity into a suitable form such as pellets at practical pressures between 50 to 150 p.s.i.g. at temperatures between about 200–290° C. Agitation is generally not necessary during product recovery as the graft polymer product in fine particle form in the molten polycaprolactam has much less tendency to coalesce than the copolymer starting material in the liquid monomer. If desired, the recovered product may be washed and dried to remove residual monomer.

The process of the present invention employs a terminator for the polyamide forming polymerization reaction. Two immediate benefits are believed to be derived from the use of the terminator in the process of the invention. A first benefit is believed to be derived from the fact that the terminator slows the polymerization reaction thereby increasing the time for and accordingly the degree of grafting onto the copolymer backbone. The terminator additionally permits control of melt index of the product with attendant benefits including control and efficiency over the course of product recovery as well as in properties of the product itself. Thus, the terminating agent permits the reaction to be brought to a stable viscosity by steam or water vapor termination whereas such termination could not be effectively accomplished without such material. The terminator additionally benefits the product by reducing the length of the polyamide grafts and thus distribution or variation in the length of the grafted chains on the copolymer backbone. The terminator employed in the invention process may be any of the materials well known as terminators for polyamide-forming polymerizations. Examples of such terminating agents include monocarboxylic acids such as acetic acid and dicarboxylic acids such as sebacic acid. Other organic acids may be employed as well as other reagents reactive with amines such as monoisocyanates, etc. There is no particular limitation on the type of terminator employed in the invention although we have preference for the dicarboxylic acids of 6 to 18 carbon atoms such as sebacic acid and generally materials which do not volatilize to any substantial degree from the polymerization system at the temperatures employed. Amines may also be employed in the controlled minor quantities and are desirably premixed with the monomer prior to addition of the copolymer to lessen tendency of the amines to react with and block the grafting sites on the copolymer. The amount of terminator employed is important in obtaining the desired result. Generally an amount of terminating agent of at least about 0.0005 mole per mole of the polyamide-forming monomer is required to have the desired effect of adequately slowing the reaction and controlling melt viscosity and homogeneity of the product. An upper limit for the amount of terminator is about 0.05 mole per mole of the monomer. Excessive amounts of terminator are desirably avoided as having the effect of capping or blocking an excessive number of the amine end groups on the polyamide and therefore tending to undesirably restrict the degree of grafting on the copolymer. The more preferred amount of terminating agent is within the range of 0.002 to 0.005 mole per mole of the monomer.

The graft polymers produced by the invention have a copolymeric backbone base of recurring ethylenic units of not more than 10 carbon atoms and can be, for example, of either of the following formulas:

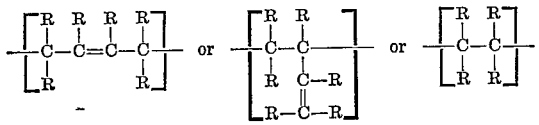

wherein each R can be independently hydrogen, halogen and substituted or unsubstituted alkyl radical of up to 8 carbon atoms. The backbone copolymer also contains alkylene units of a maximum of 10 carbon atoms, the alkylene units each bearing a pendant organic radical which is composed of or includes a carboxy radical such as a carboxyl radical or ester or salt of such acid radical. The polymer contains polyamide grafts, having consecutively recurring units of the formula:

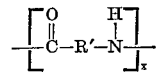

wherein R' is a polymethylene diradical of at least 5 methylene groups and $x$ is a cardinal number of at least 2, the terminal nitrogen of each graft being attached to one of said pendant radicals.

The method of the invention more particularly involves the production of graft polymers by polymerizing in the melt an omega-amino carboxylic acid or its polyamide-forming derivatives of at least six carbon atoms, such as the monoamino-monocarboxylic acids and esters, amides, or lactams of the monoamino-monocarboxylic acids, the polymerization being conducted in the presence of a copolymer having, as the major co-monomer component, a polymerizable ethylenically unsaturated material of a maximum of 10 carbon atoms, and as the minor co-monomer component, a monofunctional organic acid, its ester or salt to provide an active site for grafting a polyamide. Substituted as well as unsubstituted ethylenically unsaturated materials can be used as the major co-monomer for the backbone copolymer employed in the invention. In the following formula of the major co-monomer:

$$\begin{array}{c} R \quad R \\ | \quad | \\ C=C \\ | \quad | \\ R \quad R \end{array}$$

each R can be, independently from each other, one of a number of substituted or unsubstituted organic radicals, halogen or hydrogen. R can stand for alkyl radicals of up to 8 carbon atoms, and in the case of using such substitutions suitable co-monomers such as butene-1, heptene-1, decene-1, etc. can be formed. By similar substitutions for R, major co-monomers, such as ethylene, propylene, butene, and the like can be provided. R can also stand for an alkyl substitution rendering the principal co-monomer a cycloaliphatic material such as cyclopentene and cyclohexene. The major co-monomer should not contain amine and amide type nitrogen substitutions which would interfere with the grafting reaction, but materials with nitro-type nitrogen substitutions can be satisfactorily used. Halogenated materials such as tetrafluoroethylene, conjugated dienes, such as butadiene-1,3 (chloroprene); and 2,3-dimethylbutadiene-1,3, etc., can also be satisfactorily employed. Of course, substitutions for each R independently can be made. Aromatics if used as the major co-monomer of the backbone polymer would impart rigidity and thus produce unsatisfactory impact strength.

The minor acid, ester, or salt-group providing unsaturated co-monomer which contributes the active linking site, contains preferably substituent carboxy radicals, which term includes acid group and derivatives thereof; and should be a monofunctional compound, such as acrylic acid, methacrylic acid, etc. The term carboxy is used herein in a conventional sense to indicate the radical:

wherein $R_2$ represents a carbon atom in the co-monomer and $R_3$ is hydroxy, alkoxyl, halogen, or an other substituent providing an active site for the polyamide graft. More particularly, the co-monomer is an unsaturated monocarboxylic acid or derivatives thereof containing 3 to 11 carbon atoms in the basic acid molecule, preferably 3 to 6 carbon atoms. Ester derivatives have between 1 to 6 carbon atoms in the ester group, preferably 1 or 2 carbon atoms. The more preferred co-monomers contain no more than 10 total carbon atoms. The acrylates are generally preferred of which methyl acrylate, methyl methacrylate and ethyl acrylate are illustrative examples. The amount of co-monomer combined with the ethylenically unsaturated monomer is between 1 to 20 mol percent of the copolymer, desirably between 1 to 10 mol percent. Molecular weight of the copolymer may vary but should be adequate to provide the desired number of grafting sites per copolymer molecule taking into account the relatively low proportion of co-monomer providing such sites in the copolymer, and should further not be so high as to disrupt the desired viscosity characteristics of the final product. Generally, the molecular weight of the copolymer is at least 10,000 and may range up to approximately 80,000, and preferably lies in the range between about 12,000 to 30,000, as determined by a Vapor Pressure Osmometer. It will be evident that the use of the terminating agent in the caprolactam polymerization permits regulation thereof to more closely balance the molecular weight of the polyamide homopolymer as desired with the molecular weight of the polyamide graft polymer which in part is controlled by the molecular weight of the starting copolymer. Hence, more homogeneous products from the standpoint of molecular weight can be produced and such homogeneity is a factor in certain end uses such as molding and especially film forming in which non-homogeneous portions of the polymer composition can introduce incongruities into the film. Copolymers useful as a backbone in the invention, are generally well known by themselves and are commercially available low-cost materials.

The following are illustrative of the omega-amino carboxylic acids and their polyamide-forming derivatives which may be used for the polyamide grafting of the side chains:

monoamino-monocarboxylic acids, such as:

ε-aminocaproic acid
11-aminoundecanoic acid
12-aminododecanoic acid esters, amides and lactams of monoamino-monocarboxylic acids such as:

ε-caprolactam
ethyl-ε-aminocaproate
ε-aminocaproamide
lauryl lactam
ethyl-11-amino undecanoate
11-aminoundecanoamide and a number of possible varieties of mixtures of the above type of materials, many of whose polymers are known under various nylon designations.

The relative proportions of the copolymer backbone material and the polyamide can vary over a fairly wide range. When the polyamide predominates, basically a high impact strength plasticized polyamide composition is provided. Products basically polyamide in nature are provided when the monomer represents about 60% to 97% of the charge, preferably 70% to 95%. On the other hand, when the hydrocarbon copolymer predominates, the resin is then of a different type, being an upgraded version of the polymer represented by the principal hydrocarbon component of the copolymer. It is to be understood that the term "copolymer" is intended to include copolymers of two or more co-monomers.

The definite structure of the polymerized compositions of the invention is not fully known. However, it is known that the active acid or ester groups of the minor co-monomer component of the copolymer provide the sites for the polyamide side-chain grafts to attach to the backbone. It is believed that the frequency of the recurring active sites in the copolymer backbone should be kept low to provide sufficient distance between adjacent polyamide grafts, as well as to prevent the percentage of the number of grafts per copolymer backbone chain from becoming too large. This appears important to prevent interconnection, by hydrogen bonding, between adjacent grafts, which would result in difficulty in thermoforming. It is believed that advantageously the copolymer should contain only between 1 and 20 mol percent of the minor co-monomer. It is not known whether, under general processing conditions, all active sites will be populated with a grafted-on polyamide side-chain, although a large percentage or even possibly all such sites are grafted onto by the present invention. Greater or lesser amount of ungrafted polyamide chains of varying length are also present in the composition, the number and length depending largely on the amount of terminator employed in the reaction mixture. At least a portion of such polyamide homopolymer chains are "capped" or terminated by the terminating agent providing important benefits in the process of the invention, the number of such capped chains again depending on the amount of such agent employed.

The following examples in which parts and percentages are by weight unless otherwise indicated demonstate the practice and advantages of the present invention.

Example 1

To an enlarged autoclave equipped with a high speed high shear helical type agitator, gas inlet and outlet and pressure valve leading to an extruder, there was charged 150 parts of anhydrous epsilon-caprolactam and 0.84 part of sebacic acid. The charge was externally heated to about 90° C. and agitation commenced. Into the autoclave there was then charged 16.7 parts of an ethylene-ethyl acrylate copolymer containing about 3.8–4.4 mol percent (18% by weight) ethylene acrylate, having a molecular weight of 17,000, as determined by a Vapor Phase Osmometer (Mechrolab No. 302). The copolymer was obtained commercially under the trademark designation "DPD 6169." The ethylene-ethyl acrylate copolymer had a softening point of about 60–70° C. and was charged in the form of large pellets as commercially obtained. The autoclave was purged with nitrogen and heated to 250° C. while maintaining agitation at a rate of about 20 r.p.m. The temperature of 250° C. was maintained along with the shearing agitation over a period of about 3.5 hours to form a cream-like dispersion of the ε-caprolactam and ethylene-ethyl acrylate copolymer which was now dispersed in the form of very fine molten particles. The dispersion was then cooled to about 200° C. and the reactor contents then placed under a pressure of 40 p.s.i.g. using clean dry steam. The reactor contents were maintained under steam pressure for about 30 minutes and then the pressure and steam slowly vented over the course of an additional 30 minutes to avoid too rapid initiation of the caprolactam polymerization. The reactor contents occupied approximately one-half the total volume of the autoclave. The steam was replaced by nitrogen continuously fed in and out of the autoclave at a rate of about 4 liters per minute. The temperature was then increased to 255° C. and the feed of nitrogen gas and agitation maintained over the course of about 15 hours until the melt index of the molten graft polymer was about 7–8. The nitrogen gas flow was stopped and water vapor allowed to accumulate in the atmosphere about the reaction mass until a relatively constant melt index of 7–8 was obtained. To demonstate the viscosity stability of the product at this point the reaction vessel was sealed and agitation continued for an additional 20 hours after which the molten product showed substantially no change in the melt index of 7–8 previously obtained on unwashed samples. Over this period a differential pressure of about 5–10 inches of mercury developed within the autoclave. A pressure of about 65 p.s.i.g.

was then applied using nitrogen gas and the molten product discharged from the autoclave into an extruder from which the product was formed into pellets. The graft copolymer after washing and drying had the properties summarized below in Table I.

Example 2

Employing the apparatus and procedure of Example 1 a graft polymer was prepared from an initial charge of 100 parts of ε-caprolactam, 0.63 part of sebacic acid and 25 parts of the same ethylene-ethyl acrylate copolymer such that the ratio of caprolactam monomer to ethylene-ethyl acrylate copolymer was 4 to 1 instead of 9 to 1 ratio of Example 1. In this example the polymerization was carried out at 255° C. until the melt index of the graft polymer product was about 4 on unwashed samples. During polymerization the nitrogen gas flow over the reaction mass was adjusted to give about the same ratio of volume of gas flow per hour to volume of reactor content as in Example 1. Extrusion from the autoclave was carried out at a pressure of 75 p.s.i.g. Properties of the polymer product after washing and drying are given below in Table I.

Example 3

Procedure and apparatus were similar to the preceding examples except that the apparatus was of larger scale. In this example 8,000 parts of ε-caprolactam was charged along with 50 parts of sebacic acid and 2,000 parts of the same ethylene-ethyl acrylate copolymer. The ratio of caprolactam to copolymer was 4 to 1 as in Example 2 and the amount of sebacic acid was about 0.625% or also approximately the same as in Example 2. The polymerization was carried out at a temperature of 255° C. until the polymer product had a melt index of 3.0. During polymerization the nitrogen gas flow over the reaction mass was adjusted to give about the same ratio of volume of gas flow per hour to volume of reactor content as in Example 1. Extrusion from the reactor was effected at a pressure of 65 p.s.i.g. Properties of the washed and dried graft polymer are given below in Table I.

Control

In Table I below data is given for comparative purposes for a nylon 6 polymer (polycaprolactam) having a number average molecular weight of 20,000 as determined by end group analysis and available commercially under the trademark "Plaskon" 8200. The nylon 6 was extruded and washed with water at 90° C. until the content of water extractables was about 1–2%.

TABLE I

| | Example 1 | Example 2 | Example 3 | Nylon 6 control |
|---|---|---|---|---|
| Melt index, extrudate | 3.5 | 1.5 | 1.5 | |
| Ultimate tensile strength, p.s.i. | 10,097 | 8,228 | 9,890 | 11,800 |
| Ultimate elongation, percent | 242 | 230 | 308 | 190 |
| Yield strength, p.s.i. | 9,045 | 6,172 | 6,730 | 11,800 |
| Yield elongation, percent | 7.0 | 6.7 | 7.0 | 6.0 |
| Izod impact at 72° F., ft./lbs./in. | 2.6 | 14.5 | 17.6 | 1.2 |
| Izod impact at −40° F., ft./lbs./in. | 1.4 | 1.8 | 2.9 | 0.61 |
| Ultimate flexural strength, p.s.i. | 11,765 | 6,943 | 8,371 | 16,400 |
| Flexural modulus, ×10⁵ | 3.2 | 1.8 | 2.2 | 3.95 |

Table I shows the graft polymer composition of the invention to have excellent overall properties. Thus, the properties of the graft polymer composition such as tensile strength, ultimate elongation, yield strength, and yield elongation compare favorably with the properties of the nylon 6 or polycaprolactam homopolymer. Impact strength of the graft polymer composition of Example 1 at room temperature (72° F.) is substantially improved or more than doubled over the nylon homopolymer while the graft polymers of Examples 2 and 3 exhibit exceptionally high impact at room temperature. Of particular importance is the fact that the graft polymer of all three Examples 1–3 have impact strength above 1.0 at minus 40° F. compared to only about 0.61 for the nylon homopolymer.

In Table II, below, selected important properties of the graft polymer compositions produced by Examples 1–3 above are summarized for comparison with nylon 6 on the one hand and four additional control materials designated A–D, inclusive. Controls A and B are compositions prepared by blending of nylon 6 with 10% and 25% respectively of the ethylene-ethyl acrylate copolymer employed in the preceding examples. In preparing the blended compositions, the pellets of the copolymer were tumbled until thoroughly admixed with the nylon 6. The dry combination had a moisture content of 0.2% and was extruded in a manner similar to that employed in Examples 1–3, above. The extruded blend was quickly surface-quenched with water and pelletized while still hot, and then injection molded into standard micro-tensile bars for evaluation of physical properties. Control C was a polymer prepared by polymerizing caprolactam in the presence of 25% by total weight of an ethylene-propylene copolymer obtained under the trademark EPR 404. Control C was prepared the same as Control C in the above-referred to application Ser. No. 436,685. Control D was a polymer prepared by polymerizing caprolactam in the presence of about 10% by total weight of a copolymer of ethylene and vinyl acetate obtained under the trademark "DQDE 1868."

TABLE II

| | Impact strength, ft.-lb./in. notch | | Elongation, percent | |
|---|---|---|---|---|
| | 23° | −40° | UE | YE |
| Example 1 | 2.6 | 1.4 | 242 | 7.0 |
| Example 2 | 14.5 | 1.8 | 230 | 6.7 |
| Example 3 | 17.6 | 2.9 | 308 | 7.0 |
| Nylon 6 | 1.20 | 0.61 | 190 | 6.0 |
| Control A | 1.9 | 0.9 | 250 | 5.7 |
| Control B | 1.2 | 1.0 | 60 | 5 |
| Control C | 2.8 | 1.9 | 51 | 5 |
| Control D | 1.0 | 0.5 | 30 | 12 |

In Table II certain properties given in Table I for the graft polymers of Examples 1–3 are again recorded for comparison with control compositions A, B, C and D to confirm the formation of the graft polymer and demonstrate improvement over other modified nylon compositions. Thus, Control A representing a composition formed by mechanically working together a polycaprolactam with 10% of the ethylene-ethyl acrylate copolymer shows a slight improvement in impact strength at room temperature but more significantly, an impact strength less than 1.0 at minus 40° F. Control B representing a similar composition but containing 25% of the copolymer is substantially depreciated with respect to ultimate elongation. Control compositions C and D are similarly depreciated with Control D representing the product formed by polymerization of caprolactam in the presence of an ethylene-vinyl acetate copolymer exhibiting impact strengths which are depreciated over the nylon homopolymer both at ambient and reduced temperatures.

The graft polymer products of Examples 2–3 were further evaluated by extraction of a portion of each in refluxing toluene over a 24 hour period. In each case less than 0.5% of the product was found to be soluble while the ethylene-ethyl acrylate copolymer was known to be fully soluble in toluene at 80° C. Other portions of the products of Examples 2–3 were also treated with hot trifluoroethanol, a good solvent for polycaprolactam, and about 74% of the polymer composition was found to be soluble. Infra-red spectra analysis of the remaining undissolved 26% indicated the presence of both polyethylene and amide in the absorption spectrum. From the above results it is concluded that only about 74% of the polymer product was polycaprolactam homopolymer while the remaining 26% was grafted polymer containing little, if any, ungrafted ethylene-ethyl acrylate copolymer.

In the above examples and description the following standard tests are applicable:

Melt Index by ASTM D1238–57T modified as a high load determination at 240° C. with a 1000 gram load; Ultimate Tensile Strength by ASTM D638–58T; Ultimate Elongation by ASTM D638–58T; Yield Strength by ASTM D638–58T; Izod Impact by ASTM D256–56; Ultimate Flexural Strength by ASTM D790–58T; Flexural Modulus by ASTM D790–58T.

Although certain preferred embodiments of the invention have been disclosed for purpose of illustration, it will be evident that various changes and modifications may be made therein without departing from the scope and spirit of the invention.

We claim:

1. The method for producing a graft copolymer composition from a monomer selected from the group consisting of omega-amino carboxylic acids having at least 6 carbon atoms, their esters, amides and lactams, and mixtures thereof, and a copolymer of an ethylenically unsaturated major comonomer of the formula:

$$\begin{array}{c} R \quad R \\ | \quad | \\ C{=}C \\ | \quad | \\ R \quad R \end{array}$$

wherein R is independently selected from the group consisting of hydrogen, halogen and alkyl radicals of up to 8 carbon atoms and a minor co-monomer selected from the group consisting of acrylic acid, methacrylic acid and their esters and salts, the minor co-monomer being present in amount of 1 to 20 mol percent of the total amount of co-monomers; the acid, ester or salt groups of the minor co-monomer serving as active sites onto which the monomer graft polymerizes, which comprises:

(A) admixing said monomer and copolymer with shearing agitation at a temperature above the softening point of the copolymer to form a dispersion in the monomer of fine particles of the copolymer, (B) maintaining said dispersion and passing steam over said dispersion to initiate polymerization of the monomer, (C) displacing the steam with an inert gas and polymerizing said monomer at a temperature between 230° to 290° C. in the presence of a terminating agent present in the reaction mixture in an amount between about 0.0005 to 0.5 mole per mole of the originally charged monomer while maintaining flow of inert gas above the reaction mixture, (D) terminating the polymerization by the presence of water vapor in the atmosphere above the reaction mixture to give a molten polymer composition having a melt index between 0.1 to 100 containing polyamide homopolymer and polyamide graft copolymer containing polyamide grafts having consequently recurring units of the formula $$\left[\begin{array}{c} O \quad H \\ \| \quad | \\ {-}C{-}R^1{-}N{-} \end{array}\right]_x$$

wherein $R^1$ is a polymethylene di-radical of at least 5 methylene groups and $x$ is a cardinal number of at least 2, and (E) recovering the polymer composition.

2. The method of claim 1 in which the dispersion is formed by admixing with shearing agitation at a temperature between 200° C. to 280° C.

3. The method of claim 1 in which the terminating agent is premixed with the monomer prior to addition of the copolymer and formation of the dispersion.

4. The method of claim 1 in which the terminating agent is a dicarboxylic acid of 6 to 18 carbon atoms.

5. The method of claim 1 in which the terminating agent is present in an amount between 0.002 to 0.005 mole per mole of monomer.

6. The method of claim 1 in which the inert gas flows over the reaction mixture during polymerization at a rate regulated between 2 to 5 volumes, as measured at standard pressure and temperature, per hour per volume of said mixture.

7. The method of claim 1 in which the monomer is epsilon-caprolactam.

8. The method of claim 7 in which the ethylenic copolymer is a copolymer of ethylene and 2 to 15% by weight of an acrylate.

9. The method of claim 8 in which the acrylate is ethyl acrylate.

10. The method of claim 9 in which the terminating agent is sebacic acid, in which the polymer composition has a melt index between 1 and 30, and in which the composition is recovered by extrusion.

References Cited

UNITED STATES PATENTS

| | | | |
|---|---|---|---|
| 3,136,738 | 6/1964 | Hedrick | 260—857 |
| 3,243,476 | 3/1966 | Black | 260—857 |
| 3,243,477 | 3/1966 | Black | 260—857 |
| 3,261,855 | 7/1966 | Graubner | 260—857 |
| 3,325,561 | 6/1967 | Grillo | 260—857 |
| 3,388,186 | 6/1968 | Kray | 260—857 |

MURRAY TILLMAN, Primary Examiner

PAUL LIEBERMAN, Assistant Examiner

U.S. Cl. X.R.

260—78, 86.7